United States Patent
Wylie et al.

(10) Patent No.: US 10,499,569 B2
(45) Date of Patent: Dec. 10, 2019

(54) GARDEN SEED PLANTER

(71) Applicant: Bloomers Edutainment LLC, Venice, CA (US)

(72) Inventors: Cynthia Wylie, Venice, CA (US); Cassondra Hegyes, Venice, CA (US)

(73) Assignee: Bloomers Edutainment LLC, Venice, CA (US)

( * ) Notice: Subject to any disclaimer, the term of this patent is extended or adjusted under 35 U.S.C. 154(b) by 221 days.

(21) Appl. No.: 14/778,571

(22) PCT Filed: Mar. 5, 2015

(86) PCT No.: PCT/US2015/018891
§ 371 (c)(1),
(2) Date: Sep. 18, 2015

(87) PCT Pub. No.: WO2015/134713
PCT Pub. Date: Sep. 11, 2015

(65) Prior Publication Data
US 2016/0205873 A1  Jul. 21, 2016

Related U.S. Application Data

(60) Provisional application No. 61/949,853, filed on Mar. 7, 2014.

(51) Int. Cl.
*A01C 1/04* (2006.01)
*A01G 9/02* (2018.01)
(Continued)

(52) U.S. Cl.
CPC ............ *A01G 9/0291* (2018.02); *A01C 1/046* (2013.01); *A01G 9/085* (2013.01); *A01C 1/04* (2013.01); *A01G 9/124* (2013.01)

(58) Field of Classification Search
CPC ........ A01G 9/102; A01G 9/085; A01G 9/124; A01G 9/021; A01G 9/0291; A01C 1/046; A01C 1/04
See application file for complete search history.

(56) References Cited

U.S. PATENT DOCUMENTS 5,456,733 A    10/1995  Hamilton, Jr.
5,720,129 A *   2/1998  Lantinberg ............... A01C 1/04
                                                47/48.5
(Continued)

FOREIGN PATENT DOCUMENTS

EP        0885554 A3    9/1999
JP     2001148910 A  *  6/2001
WO  WO-2010069067 A1 *  6/2010   ............... A01C 1/04

OTHER PUBLICATIONS

Group 4; "Introducing Miracle-Gro GroAbles Seed Pods;" YouTube video; https://www.youtube.com/watch?v=X-wZWRIRNAI; length: 1:09; accessed Mar. 10, 2017; published Oct. 2013.*
(Continued)

*Primary Examiner* — Daniel J Colilla
(74) *Attorney, Agent, or Firm* — David M. Kleiman

(57) ABSTRACT

A garden seed planter that displays a color for identifying the type of garden product that will be produced by a plant from a seed contained in a capsule of the garden seed planter. In a preferred lollipop form embodiment at least a portion of the garden seed planter capsule has a colored coating that is substantially the same color as the garden product produced by the plant to be grown from the seed, and there is a planter stake attached to the seed capsule having a portion that also displays substantially the same color as the garden product.

7 Claims, 5 Drawing Sheets

(51) Int. Cl.
*A01G 9/029* (2018.01)
*A01G 9/08* (2006.01)
*A01G 9/12* (2006.01)

(56) References Cited

U.S. PATENT DOCUMENTS

| | | | | |
|---|---|---|---|---|
| 6,105,293 | A | * | 8/2000 | Eason .................... A01G 9/006 40/645 |
| 8,256,160 | B2 | | 9/2012 | Rubin |
| D724,480 | S | | 3/2015 | Wylie et al. |
| 2010/0263274 | A1 | * | 10/2010 | Corak ...................... A01C 1/06 47/57.6 |
| 2011/0239535 | A1 | | 10/2011 | Conrad |
| 2015/0156973 | A1 | * | 6/2015 | Prinster ................. A01G 9/102 47/65.7 |
| 2015/0202914 | A1 | * | 7/2015 | Bollini ..................... A01C 1/04 47/58.1 SE |
| 2016/0262317 | A1 | * | 9/2016 | Scott-Harden ....... A01G 9/0291 |

OTHER PUBLICATIONS

Zach Aboard website; "Poo Pops (tutorial and giveaway!);" http://zachaboard.blogspot.com/2011/04/poo-pops-tutorial-and-giveaway.html; accessed Mar. 10, 2017; published Apr. 2011.*

Wayback Machine (from archive.org) archive results of http://zachaboard.blogspot.com/2011/04/poo-pops-tutorial-and-giveaway.html; accessed Jul. 19, 2017.*

YouTube help information page; "Upload Videos;" located at https://support.google.com/youtube/answer/57407?hl=en&ref_topic=2888648; accessed on Jul. 19, 2017.*

Sprout: a pencil with potential by democratech—Kickstarter; https://web.archive.org/web/20120824031209/http://www.kickstarter.com/projects/democratech/sprout-a-pencil-with-a-seed; accessed on Mar. 7, 2019; published Aug. 24, 2012. (Year: 2012).*

Sprout plantable pencils; Amazon.com website; https://www.amazon.com/gp/product/B00F1Z7TTE; accessed on Mar. 7, 2019; published Sep. 8, 2013. (Year: 2013).*

Biogdegradable Seed Stake website; https://web.archive.org/web/20120504020915/https://www.qualitylogoproducts.com/tradeshow-promotions/biodegradable-seed-stake.htm; accessed Mar. 7, 2019; published May 4, 2012. (Year: 2012).*

Chopstick Gardens; Yanko Design; https://www.yankodesign.com/2011/10/18/chopstick-gardens/; accessed Mar. 8, 2019; published Oct. 18, 2011. (Year: 2011).*

Paint Mixing Stick Garden Signs: Repeat Crafter Me; http://www.repeatcrafterme.com/2013/04/paint-mixing-stick-garden-signs.html; accessed Mar. 8, 1029; published Apr. 11, 2013. (Year: 2013).*

Sprout—A Pencil That Grows; Youtube.com video screenshots; https://www.youtube.com/watch?v=A_Ag-rZF8sg; accessed on Mar. 8, 2019; published May 30, 2013. (Year: 2013).*

Garden Pops—Gourmet Seed Ball Lollipops: http://poptasticbride.com/2011/03/floral-pops-and-garden-bon-bons/#.U1bLO6JLNtN.

Grow Pride—100 Rainbow seed bombs: http://www.etsy.com/listing/101604205/grow-pride-100-rainbow-seed-bombs?utm_source=google&utm_medium=product_listing_promoted&utm_campaign=weddings_low&gclid=CKP1w7O6prkCFU5xQgodJnsAww.

Merriam-Webster online dictionary definition of "capsule", https://www.merriam-webster.com/dictionary/capsule, retrieved Jun. 6, 2017.

Merriam-Webster online dictionary definition of "cavity", https://www.merriam-webster.com/dictionary/cavity, retrieved Jun. 7, 2017.

* cited by examiner

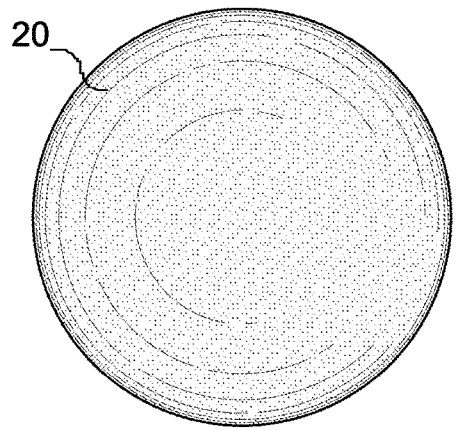
Fig. 2
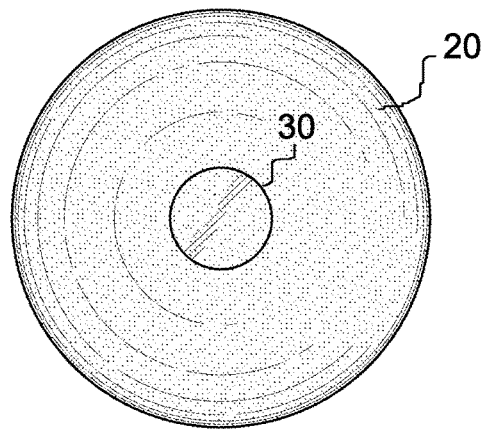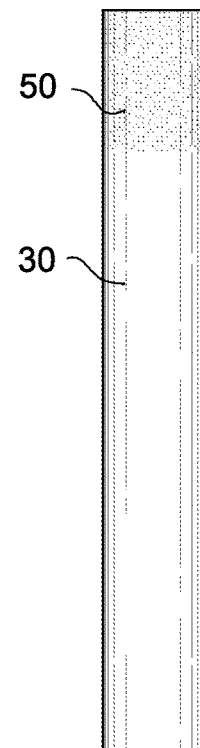
Fig. 3  Fig. 4

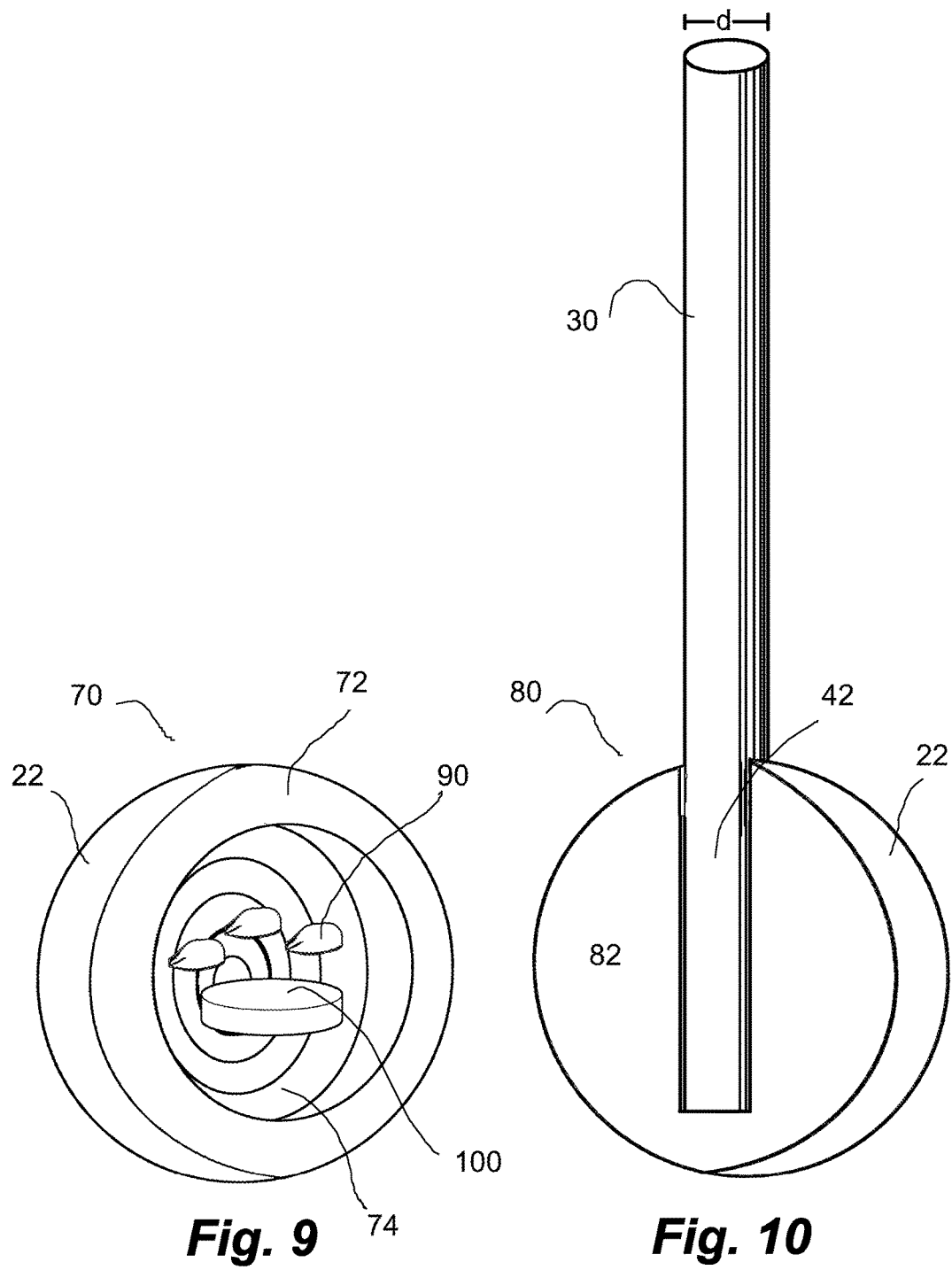

GARDEN SEED PLANTER

This application claims the benefit of priority of U.S. provisional patent application 61/949,853 filed on Mar. 7, 2014 the contents of which are hereby incorporated by reference.

TECHNICAL FIELD

The present invention is in the area of garden seed planting, and more particularly pertains to an article of manufacture for packaging garden product seeds with fertilizer for planting in the earth or in plant pots.

DISCLOSURE OF THE INVENTION

The present invention is for an environmentally friendly and easy to use garden seed planter that is appropriate for all ages, but is intended to be particularly appealing to, and safe for, use by children.

The garden seed planter of the present invention displays on at least a portion of an outer surface a color that is substantially the same as the garden product produced by the plant to be grown from the seed (e.g. red for tomato, orange for carrot, light green for snow peas, dark green for lettuce, yellow for yellow squash, and fuchsia for radish). For purposes of this invention a garden product means a fruit, vegetable, flower, herb or other product of a plant that is intended for human consumption or to beautify a living space or garden environment.

In a contemplated embodiment the garden seed planter has a substantially spherical capsule containing a plant seed, and a planter stake attached to an extending out of the capsule such that the garden seed planter bears a resemblance to a traditional lollipop. It is contemplated that this appearance is appealing to children. However, other configurations (e.g. just a capsule without a planter stake) and shapes (e.g. a capsule that is square, trapezoidal, etc. . . . ) are also possible without departing from the invention.

It is contemplated that in embodiments of the present garden seed planter invention that are just a capsule containing a seed without an attached planter stake that at least a portion of the outer capsule surface will display a color that is substantially the same color as the garden product produced by a plant grown from the seed contained in the capsule. Such a color displayed on the outer capsule surface may result from the color of the capsule material itself, or it may be achieved with a color coating that is applied to at least a portion of the outer capsule surface.

In those "lollipop" embodiments with a planter stake attached to the capsule it is contemplated that either the planter stake alone, or the capsule alone, may display a color that is substantially the same color as the garden product produced by a plant grown from the seed contained in the capsule. However, it is contemplated that at least a portion of the planter stake, and at least a portion of the capsule, would display the same color, which would be substantially the same color as the garden product produced by a plant grown from the seed contained in the capsule. In a preferred "lollipop" embodiment illustrated herein the entire outer surface the capsule displays substantially the same color as the garden product produced by a plant grown from the seed contained in the capsule, with a distal end of the planter stake displaying the same garden product color as the capsule. As with the capsule, the color displayed by the planter stake may be the result of the color of the planter stake material itself, or it may be achieved with a color coating that is applied to at least a portion of the outer planter stake surface.

The planter stake may also have measurement marks on its surface so that the progress of growth for a plant from a seed in the capsule may be monitored. It is contemplated that any materials or coatings used in or on the garden seed planter would be non-toxic and safe for use by children, and may include, by way of example and not limitation, colored water-based paints, vegetable dye, and/or a sugar based coating (which helps to promote plant growth by attracting beneficial bacteria).

In a preferred embodiment the seed capsule is made from a capsule mixture that comprises an environmentally friendly paper pulp mixture (e.g. a mixture of water and recycled paper). In contemplated embodiments the capsule mixture, and resulting capsule, may also contain in addition to paper an environmentally friendly and non-toxic adhesive, fertilizer, and/or dolomite. The seed for the plant to be grown is contained within the capsule. It is contemplated that the fertilizer used may be worm castings. In a preferred embodiment the capsule of the garden seed planter has within it a seed cavity that is used to contain at least one seed for the plant to be grown. A fertilizer may also be placed in the seed cavity with the seed. It is contemplated that the fertilizer placed in a seed cavity may be in the form of a compressed pellet of worm castings, or worm castings grounds.

In a contemplated embodiment the capsule of the present invention is made by first making two separate halves of the capsule from a capsule mixture. Specifically, there would be a seed half of the capsule that contains a seed cavity for locating at least one seed and a fertilizer, and a stake half of the capsule that contains a stake cavity for placing and attaching a planter stake to the stake half of the seed capsule. In an embodiment where there is only a capsule and no attached planter stake the capsule may comprise two seed halves with at least one seed half having a seed cavity, although both seed halves may have a seed cavity.

In a preferred process specially adapted for making the seed planter of the present invention the respective halves of the capsule are made using concave cavities for receiving quantities of the capsule mixture. For a seed half a first concave cavity is filled with a first quantity of the capsule mixture that is in a substantially fluid form, and then a seed cavity shaper is placed into the fluid first quantity of capsule mixture that is contained in the first concave cavity. For a stake half a second concave cavity is filled with a second quantity of the substantially fluid capsule mixture, and then a stake cavity shaper is placed into the fluid capsule mixture contained in the second concave cavity. The selection of materials for the seed cavity shaper and the stake cavity shaper, as well as the capsule mixture viscosity, should be such that the seed cavity shaper and the stake cavity shaker have the appropriate buoyancy when placed in the fluid capsule mixture to displace the desired volume of capsule mixture from the concave cavities without the shapers making contact with the bottom surface of the concave cavities to ensure that there will be no holes in the resulting capsule wall.

The fluid capsule mixtures contained in the concave cavities are then solidified with their respective shapers in place. In a preferred embodiment of the process the capsule mixture is primarily comprised of a paper pulp mixture and is solidified by subjecting the capsule mixture to heat (i.e. an elevated temperature) for an appropriate amount of time. The application of heat may be achieved by baking in an oven at an elevated temperature for a period of time until the capsule mixture solidifies. In such a preferred process the concave cavities are then removed from the oven, allowed to cool to room temperature, and any seed cavity shapers and stake cavity shapers are removed, thus leaving in place a seed cavity and stake cavity in the respective halves. The halves are then removed from the concave cavities.

In the illustrated preferred embodiment a planter stake is placed in the stake cavity of a stake half, and at least one seed and a fertilizer (either a pellet or grounds) are located in the seed cavity of a seed half. The two halves (e.g. the seed half and the stake half) are then adhered together to form a capsule having an internal seed cavity containing the seed and fertilizer, and a planter stake attached to and extending away from the capsule. In an alternative embodiment without a planter stake the two seed halves are adhered together without a planter stake. At least a portion of the capsule and/or planter stake then receive a color coating that is substantially the same color as the garden product produced by as plant grown from the seed in the capsule.

To use the garden seed planter of the present invention the capsule is planted in soil. If the embodiment used is one with a planter stake then the planter stake extends vertically above the soil surface. When water is added to the planting location it is absorbed by the capsule. This causes the capsule to disintegrate into the soil, and any compressed fertilizer pellet used in the capsule to expand. If environmental conditions are otherwise suitable the seeds in the capsule will germinate. Expansion of the fertilizer pellet helps to open up the capsule to facilitate the growth of the plant from the germinating seed through the soil. In a preferred embodiment where the capsule is comprised of paper then the paper fibers of the disintegrated capsule retain water which in addition to the fertilizer in the capsule is helpful to the growth of the plant.

BRIEF DESCRIPTION OF THE DRAWINGS

FIG. 2 is a bottom view of a preferred "lollipop" embodiment of the garden seed planter with a garden product color coordinated capsule and planter stake.

FIG. 3 is a top view of a preferred "lollipop" embodiment of the garden seed planter with a garden product color coordinated capsule and planter stake.

FIG. 4 is a side view of a preferred "lollipop" embodiment of the garden seed planter with a garden product color coordinated capsule and planter stake.

FIG. 9 is a perspective view of a preferred embodiment of a seed half of the capsule of the garden seed planter of the present invention showing seeds and a fertilizer pellet in the seed cavity.

FIG. 10 is a perspective view of a preferred embodiment of a stake half of the capsule of the garden seed planter of the present invention showing a planter stake in the stake cavity.

BEST MODE FOR CARRYING OUT THE INVENTION

Figure 1:
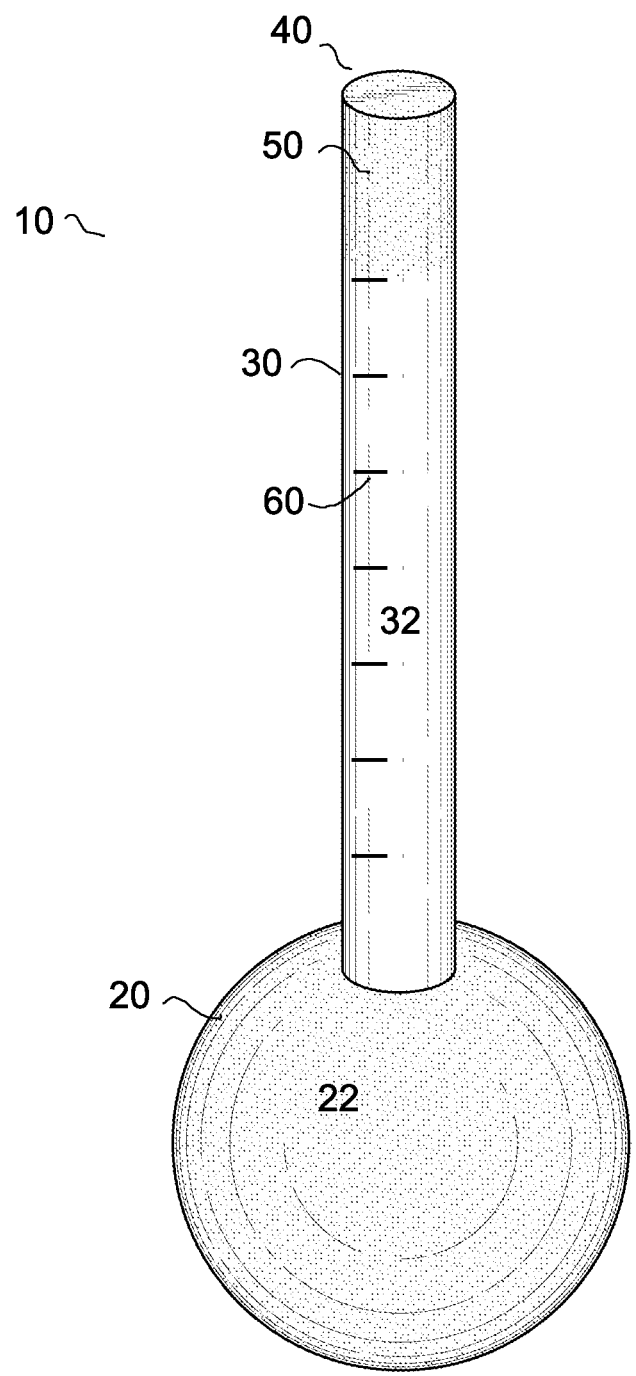
FIG. 1 is a right front perspective view of a preferred "lollipop" embodiment of the garden seed planter with a garden product color coordinated capsule and planter stake.

A detailed description is now provided for an illustrated preferred exemplary "lollipop" embodiment of the present garden seed planter invention that includes a planter stake attached to the capsule. Referring to FIG. 1 a preferred exemplary embodiment of garden seed planter 10 generally comprises a capsule 20 having an outer surface 22. Capsule 20 is joined to a planter stake 30 having an outer surface 32. In such preferred embodiment capsule 20 is substantially spherical in shape, and planter stake 30 is substantially cylindrical in shape.

A garden product identifier portion 50 of the outer surface 32 of planter stake 30 displays a color that is substantially the same color as the garden product produced by a plant grown from the seed contained in the seed cavity of the seed capsule (e.g. red for tomato, orange for carrot, light green for snow peas, dark green for lettuce, yellow for yellow squash, and fuchsia for radish). Such garden product identifier portion 50 of planter stake 30 may be located on outer surface 32 at a distal end 40 of planter stake 30. In a preferred contemplated embodiment garden product identifier portion 50 may be, by way of example and not limitation, a color coating of distal end 40 (e.g. non-toxic water-based paint).

Alternative embodiments are also contemplated where garden product identifier portion 50 may be in a form other than a coating of distal end 40. For example, garden product identifier portion 50 may be in the form of a sticker or a tag attached to distal end 40. It is further contemplated that means in addition to color may be used with garden product identifier portion 50. Such additional means on planter stake 30 may comprise for example printed text, graphic symbols, or a tactile writing system (e.g. Braille). Similarly, outer surface 22 of capsule 20 may also have printed text, graphic symbols, or a tactile writing system (e.g. Braille).

In a preferred embodiment it is contemplated that measurement marks 60 would be located along outer surface 32 of planter stake 30. Measurement marks 60 are used to track the progress of plant growth from the seeds once capsule 20 has been planted in soil. Measurement marks 60 may, for example, be a coating printed onto planter stake 30, and may include printed text, graphic symbols, and/or a tactile writing system to help communicate measurement information (e.g. the height in centimeters or inches).

Planter stake 30 is attached to capsule 20. In the preferred illustrated embodiment outer surface 22 of capsule 20 also displays a color that is substantially the same as the garden product that is produced by a plant grown from seeds 90 contained within capsule 20. In alternative embodiments it may be just planter stake 30 that displays a color that is substantially the same as the garden product that is produced by a plant grown from seeds 90 contained within capsule 20, with capsule 20 displaying a different color. For alternative embodiments where there is just a capsule and no planter stake at least a portion of outer surface 22 of capsule 20 will display a color that is substantially the same as the garden product that is produced by a plant grown from seeds 90 contained within capsule 20. A color coating of a portion of either planter stake 30 or capsule 20 may be achieved, by way of example and not limitation, with non-toxic paint, vegetable dye, or a sugar-based coating.

Figure 5:
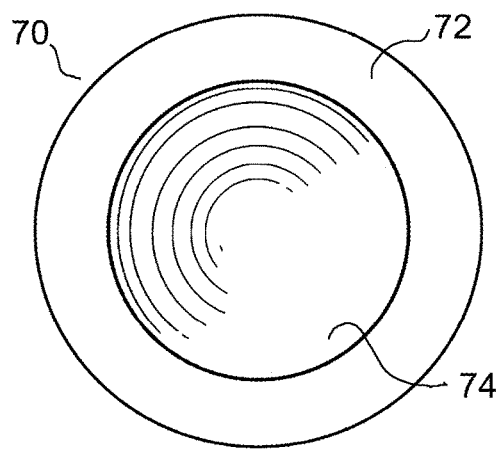
FIG. 5 is a side section view of a preferred embodiment of a seed half showing the seed cavity of the capsule of the garden seed planter of the present invention.
Figure 7:
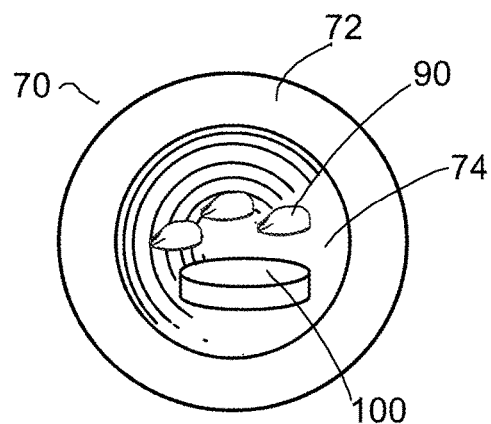
FIG. 7 is a side section view of a preferred embodiment of a seed half of the capsule of the garden seed planter of the present invention showing seeds and a fertilizer pellet in the seed cavity.

In the illustrated preferred embodiment capsule 20 is constructed of a seed half 70 that is attached to a stake half 80, such as shown in FIGS. 9 and 10. Referring to FIGS. 5 and 9 seed half 70 has a substantially flat seed half joining surface 72 that surrounds a concave seed cavity 74. Seed cavity 74 has a volume sufficient to contain at least a seed 90 and a fertilizer 100 such that no part of seed 90 and fertilizer 100 extends above joining surface 72 when seed 90 and fertilizer 100 are located in seed cavity 74, as shown for example in FIGS. 7 and 9.

Figure 6:
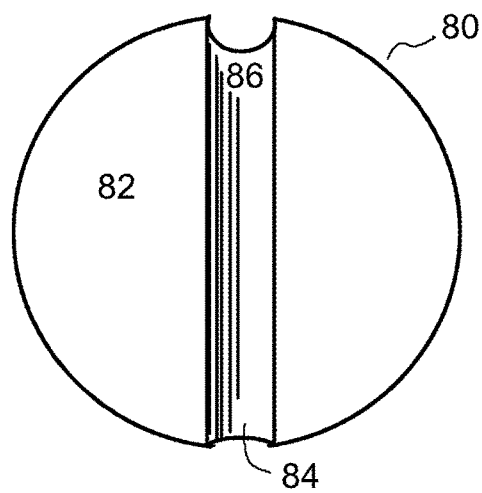
FIG. 6 is a side section view of a preferred embodiment of a stake half showing the stake cavity of the capsule of the garden seed planter of the present invention.
Figure 8:
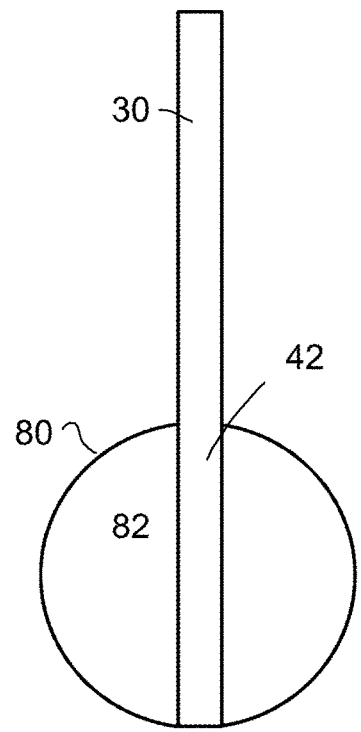
FIG. 8 is a side section view of a preferred embodiment of a stake half of the capsule of the garden seed planter of the present invention showing a planter stake in the stake cavity.

Referring to FIG. 6 stake half 80 has a substantially flat stake half joining surface 82 that substantially surrounds a concave stake cavity 84. Stake cavity 84 preferably has a depth equal to, or slightly greater than, the outer diameter d of planter stake 30 at a lower end portion 42 of stake 30 such that lower end portion 42 of planter stake 30 placed inside stake cavity 84 will not extend laterally out of stake cavity 84 above joining surface 82, as shown in FIGS. 3 and 8. Stake cavity 84 has an opening at an end through outer surface 22 to facilitate location of lower end portion 42 of planter stake 30 in stake cavity 84. In a preferred embodiment lower end portion 42 is secured in stake cavity 84 by attaching outer surface 32 of lower end portion 42 to inner surface 86 of stake cavity 84. Outer surface 32 may, by way of example and not limitation, be attached to inner surface 86 by coating the respective surfaces with a non-toxic adhesive and pressing together. After seed 90 and fertilizer 100 are located in seed cavity 74, and lower end portion 42 of stake 30 is located in stake cavity 84, seed half 70 and stake half 80 are attached together to form capsule 20 by attaching seed half joining surface 72 to stake half joining surface 82. Seed half joining surface 72 may be attached to stake half joining surface 82 by coating the respective surfaces with, for example, a non-toxic adhesive (e.g. Elmer's® Glue-All) and pressing such surfaces together.

Seed half 70 and stake half 80 of capsule 20 are contemplated to be comprised of a capsule mixture. In a preferred embodiment the capsule mixture composition comprises paper pulp (preferably from recycled paper). In some embodiments there may also be small amounts of an adhesive, fertilizer, and/or dolomite. An exemplary capsule mixture by volume could be 100% recycled paper pulp. A preferred alternative exemplary capsule mixture by volume is 96% paper pulp, 1% adhesive, 2% fertilizer, and 1% dolomite. The adhesive used should be non-toxic (e.g. paper glue). The fertilizer may be any kind of commercially available fertilizer that is suitable for use with plants for the type of seed that will be located in capsule 20, such as for example worm castings.

Figure 11:
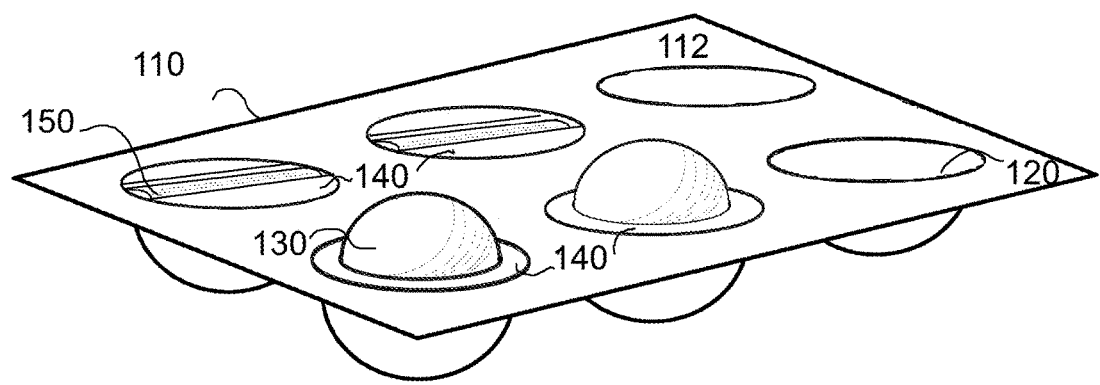
FIG. 11 is a perspective view of a tray used for forming the seed half and stake half components of the capsule of a preferred embodiment of the garden seed planter of the present invention.

Referring to FIG. 11 seed half 70 and stake half 80 are made by placing the capsule mixture 140 in a tray 110 having at least one concave cavity 120 that are substantially the size and shape of seed half 70 and stake half 80. A commonly available donut hole baking pan may serve this purpose. The concave cavities used to make seed half 70 and stake half 80 may or may not be located together in a single tray.

With respect to a seed half 70 a first concave cavity 120 in tray 110 is filled with capsule mixture 140. Seed cavity 74 is formed in capsule mixture 140 by placing a seed cavity shaper 130 (e.g. a spherical oven-safe glass marble) into capsule mixture 140 contained in concave cavity 120 to a depth sufficient to displace a volume of capsule mixture 140 equal to the desired volume of seed cavity 74. The excess capsule mixture 140 displaced by seed cavity shaper 130 should be removed such that remaining capsule mixture 140 in concave cavity 120 is substantially flat and flush with tray surface 112. The upper surface of the capsule mixture 140 located between the seed cavity shaper 130 and edge of concave cavity 120 forms seed half joining surface 72.

With respect to a stake half 80 a second concave cavity 120 in tray 110 is filled with capsule mixture 140, and stake cavity 84 is formed by placing a stake cavity shaper 150 (e.g. a short glass cylinder) into capsule mixture 140 to a depth sufficient to displace a volume of capsule mixture 140 equal to the desired volume of stake cavity 84. Excess capsule mixture 140 that is displaced by stake cavity shaper 150 should be removed such that the remaining capsule mixture 140 in concave cavity 120 is substantially flat and flush with tray surface 112. The upper surface of the capsule mixture 140 that is located between stake cavity shaper 150 and the edge of concave cavity 120 forms stake half joining surface 82.

Tray 110 with a plurality of concave cavities 120 containing capsule mixture 140 as described above is placed in an oven where capsule mixture 140 is subjected to heat until the fluid capsule mixture 140 solidifies. In an exemplary embodiment the capsule mixture 140 may be baked in tray 110 for approximately one and one-half hours at two hundred and fifty degrees Fahrenheit. Once capsule mixture 140 has been baked to a solidified state tray 110 is removed from the oven and allowed to cool down to room temperature. Once the solidified capsule mixture 140 has cooled down to room temperature seed cavity shaper 130 and the stake cavity shaper 150 are removed from capsule mixture 140. Each newly formed seed half 70 and stake half 80 is removed from tray 110.

In a preferred embodiment, after creating seed half 70 as described above, three plant seeds 90 are located in seed cavity 74 of seed half 70. The three plant seeds are all for the same type of plant, such as for example a plant for growing tomatoes. Also placed in seed cavity 74 is a fertilizer 100. In a preferred embodiment fertilizer 100 comprises a pellet of compressed worm castings that will expand greatly in volume (e.g. two to three times) when fertilizer 100 encounters and absorbs water. Alternatively fertilizer 100 may be uncompressed worm castings grounds.

In a preferred embodiment, after creating stake half 80 as described above, lower end portion 42 of stake 30 is placed in stake cavity 84 of stake half 80. Planter stake 30 may be glued in place within stake cavity 84 by using an adhesive on a surface of planter stake 30 and/or stake cavity 84 when placing planter stake 30 within stake cavity 84.

Seed half 70 and stake half 80 are attached together to form capsule 20 by attaching seed half joining surface 72 to stake half joining surface 82. Seed half joining surface 72 may be attached to stake half joining surface 82 by coating the respective surfaces with an adhesive (e.g. Elmer's® Glue-All) and pressing together. A garden identifier portion 50 at distal end 40 of planter stake 30 receives a coating that is substantially the same color as the garden product produced by the plant grown from garden seeds 90. Outer surface 22 of capsule 20 receives a coating that is substantially the same color as the garden product produced by the plant grown from garden seeds 90. One or more measurement marks 60 are placed on planter stake 30.

Figure 12:
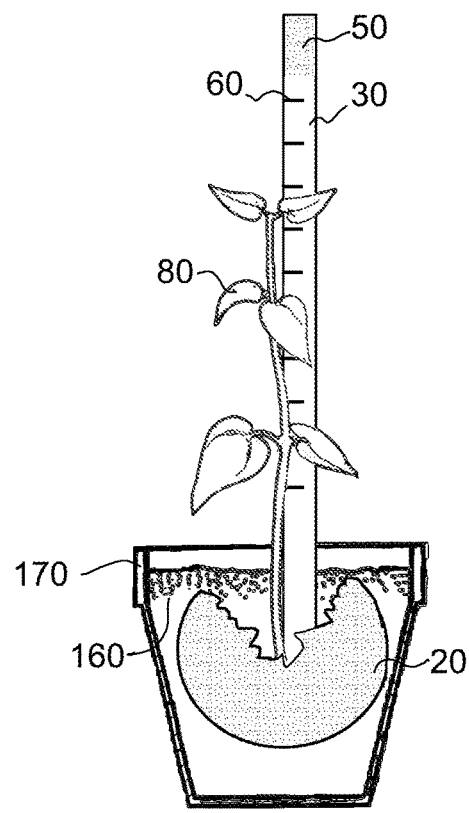
FIG. 12 is a side section view of the preferred "lollipop" embodiment of the garden seed planter planted in the soil of a plant pot with a plant having grown from the seeds in the partially disintegrated capsule.

Referring to FIG. 12, in a preferred method of using illustrated seed planter 10 the seed capsule 20 is planted (i.e. buried at least partially) in soil 160, which may be in a container 170, or just the earth, with planter stake 30 rising vertically above the surface of the soil. Planter stake 30 thus serves as a marker as to where seed capsule 20 has been planted. Garden product identifier portion 50 of planter stake 30 allows visual identification of the garden product planted after planting. Water is added at regular and appropriate intervals to the soil surrounding capsule 20. The addition of water will cause capsule 20 to absorb water and gradually disintegrate, and will also cause a compressed pellet fertilizer 100 to expand. The presence of water, soil and fertilizer around seeds 90 will facilitate germination of seeds 90. Once a plant 180 grows from a seed 90 above the surface of the soil its growth may be measured using measuring marks 60 on planter stake 30.

While particular embodiments of the present garden seed planter invention have been shown and described it will be obvious to those skilled in the art that based upon the teachings herein that changes and modifications may be made without departing from this invention and its broader aspects. Therefore, the appended claims are to encompass within their scope all such changes and modifications as are within the true spirit and scope of the invention.

The invention claimed is:

1. A garden seed planter comprising:
    a capsule that surrounds and encloses an interior seed cavity having an inner volume that is partially empty;
    said capsule comprised of a water absorbent material;
    said interior seed cavity located within a seed-half portion of said capsule; and
    a portion of a planter stake located within a stake-half portion of said capsule.

2. The garden seed planter of claim 1 further comprising a color on an outer surface of said water absorbent material, where said color is substantially the same color as the garden product produced by a plant grown from said seed.

3. The garden seed planter of claim 1 further comprising a measurement mark on an outer stake surface of said planter stake.

4. The garden seed planter of claim 1 further comprising a garden product identifier on an outer stake surface of said planter stake.

5. The garden seed planter of claim 4 wherein said garden product identifier is substantially the same color as the garden product produced by a plant grown from said seed.

6. The garden seed planter of claim 5 wherein said garden product identifier is a coating on at least a portion of said outer stake surface.

7. The garden seed planter of claim 1 further comprising a fertilizer located within said interior seed cavity.

* * * * *